US012769559B2

(12) United States Patent
Chen et al.

(10) Patent No.: US 12,769,559 B2
(45) Date of Patent: Oct. 20, 2026

(54) OPERATING SYSTEM SWITCHING METHOD FOR ACHIEVING USER-IMPERCEPTIBLE SWITCHING, APPARATUS, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Long Chen, Dongguan (CN); Zhaojin Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/762,833

(22) Filed: Jul. 3, 2024

(65) Prior Publication Data

US 2024/0354117 A1 Oct. 24, 2024

Related U.S. Application Data

(63) Continuation of application No. PCT/CN2022/135980, filed on Dec. 1, 2022.

(30) Foreign Application Priority Data

Jan. 4, 2022 (CN) ........................ 202210002314.X

(51) Int. Cl.
*G06F 9/4401* (2018.01)

(52) U.S. Cl.
CPC .................................... *G06F 9/441* (2013.01)

(58) Field of Classification Search
CPC ........ G06F 9/441; G06F 9/4418; G06F 9/445; G06F 9/44505; G06F 9/4451; G06F 9/44536
See application file for complete search history.

(56) References Cited

U.S. PATENT DOCUMENTS 8,589,952 B2 * 11/2013 Wong ...................... G06F 9/545 718/1
8,756,615 B2 * 6/2014 Chin .................. G06F 9/45558 719/319

(Continued)

FOREIGN PATENT DOCUMENTS

| | | |
|---|---|---|
| CN | 102789397 A | 11/2012 |
| CN | 103294545 A | 9/2013 |

(Continued)

OTHER PUBLICATIONS

European Search Report, European Application No. 2 2918318.1, mailed Apr. 1, 2025 (9 pages).

(Continued)

*Primary Examiner* — Raymond N Phan
(74) *Attorney, Agent, or Firm* — Ladas & Parry LLP

(57) ABSTRACT

The embodiments of the present application relate to the technical field of electronic devices. Disclosed are a method and apparatus for switching an operating system, and an electronic device and a storage medium. The method is applied to an electronic device, which electronic device can run a first operating system and a second operating system. The method comprises: when a display apparatus of an electronic device is in a screen-off state for a first duration, switching the electronic device from a first operating system to a second operating system; and if the display apparatus is switched from the screen-off state to a screen-on state, continuing to run the second operating system. By means of implementing the embodiments of the present application, an operating system can be automatically switched when a display apparatus is in a screen-off state, thereby improving the degree of intelligence of a device.

20 Claims, 3 Drawing Sheets

(56) References Cited

U.S. PATENT DOCUMENTS

| | | | | |
|---|---|---|---|---|
| 9,052,920 | B2 * | 6/2015 | Ting | G06F 9/441 |
| 9,348,633 | B2 * | 5/2016 | Galicia | G06F 9/45537 |
| 2009/0063845 | A1 | 3/2009 | Lin | |
| 2013/0054952 | A1 | 2/2013 | Shen | |
| 2015/0317181 | A1 * | 11/2015 | Chiang | G06F 9/461 713/1 |
| 2015/0317185 | A1 | 11/2015 | Wu et al. | |
| 2017/0161098 | A1 * | 6/2017 | Yin | G06F 9/48 |
| 2023/0305856 | A1 | 9/2023 | Su et al. | |
| 2024/0126559 | A1 * | 4/2024 | Huang | G06F 9/4812 |
| 2024/0176678 | A1 * | 5/2024 | Li | G06F 9/485 |

FOREIGN PATENT DOCUMENTS

| | | | |
|---|---|---|---|
| CN | 107491160 | A | 12/2017 |
| CN | 107678824 | A | 2/2018 |
| CN | 108319360 | A | 7/2018 |
| CN | 110505679 | A | 11/2019 |
| CN | 112492564 | A | 3/2021 |
| CN | 112987986 | A | 6/2021 |
| CN | 112988256 | A | 6/2021 |
| CN | 113031742 | A | 6/2021 |
| CN | 113031751 | A | 6/2021 |

OTHER PUBLICATIONS

International Search Report and Written Opinion, International Application No. PCT/CN2022/135980, mailed Feb. 11, 2023 (14 pages).

First Office Action, Chinese Application No. 202210002314.X, mailed Aug. 12, 2026 (20 pages).

* cited by examiner

OPERATING SYSTEM SWITCHING METHOD FOR ACHIEVING USER-IMPERCEPTIBLE SWITCHING, APPARATUS, ELECTRONIC DEVICE, AND STORAGE MEDIUM

CROSS REFERENCE TO RELATED APPLICATIONS

The present application is a continuation application of the international patent application No. PCT/CN2022/135980, filed on Dec. 1, 2022, which claims the priority of the Chinese patent application No. 202210002314.X, filed on Jan. 4, 2022, and contents of which are incorporated herein by its entireties.

TECHNICAL FIELD

The present disclosure relates to the field of electronic devices, and in particular to an operating system switching method, an apparatus, an electronic device, and a storage medium.

BACKGROUND

As technologies of electronic devices develops, an electronic device in the art may be installed with a plurality of operating systems at the same time. The plurality of operating systems are used to perform different tasks, such that operation and processing capacities of the electronic device may be improved.

In practice, for the electronic device in the art, switching between the plurality of operating systems may be achieved by manual operations performed by a user, which is less intelligent.

SUMMARY OF THE DISCLOSURE

The present disclosure provides an operating system switching method, an apparatus, an electronic device, and a storage medium. When a display apparatus is in an off-screen state, operating systems are automatically switched, improving the intelligence of the electronic device.

In a first aspect, the present disclosure provides an operating system switching method, performed by an electronic device, the electronic device being capable of running a first operating system and a second operating system, wherein the method includes:

- the electronic device switching from the first operating system to the second operating system in response to a displaying apparatus of the electronic device being in an off-screen state for a first time length; and
- maintaining the second operating system in response to the displaying apparatus being switched from the off-screen state to the screen-on state.

In a second aspect, the present disclosure provides an operating system switching apparatus, configured in an electronic device, the electronic device being capable of running a first operating system and a second operating system, wherein the apparatus includes:

- a first switching unit, configured to switch the electronic device from the first operating system to the second operating system in response to a displaying apparatus of the electronic device being in an off-screen state for a first time length; and
- a maintaining unit, configured to maintain the second operating system in response to the displaying apparatus being switched from the off-screen state to the screen-on state.

In a third aspect, the present disclosure provides an electronic device, including:

- a memory, storing executable program codes;
- a processor coupled to the memory.

The processor is configured to invoke the executable program codes stored in the memory to perform the method in the first aspect.

In a fourth aspect, the present disclosure provides a computer readable storage medium, storing a computer program. The computer program is configured to implement, when being executed by a processor, the method in the first aspect.

In a fifth aspect, the present disclosure provides a computer program product. The computer program product, when being run on a computer, causes the computer to perform some or all of the operations of the method in the first aspect present.

In a sixth aspect, the present disclosure provides an application releasing platform. The application releasing platform releases a computer program product. The computer program product, when being run on a computer, causes the computer to perform some or all of the operations of the method in the first aspect present.

BRIEF DESCRIPTION OF THE DRAWINGS

In order to more clearly illustrate the technical solutions in the embodiments of the present disclosure, the accompanying drawings for the embodiments will be briefly introduced in the following. Obviously, the accompanying drawings in the following description show only some of the embodiments of the present disclosure, and any ordinary skilled person in the art may obtain other drawings according to these drawings without making creative work.

DETAILED DESCRIPTION

Technical solutions in embodiments of the present disclosure will be described below by referring to the accompanying drawings of the embodiments of the present disclosure. Apparently, the described embodiments are a part of but not all of the embodiments of the present disclosure. All other embodiments, which are obtained by any ordinary skilled person in the art based on the embodiments in the present disclosure without making creative work, shall fall within the scope of the present disclosure.

It should be noted that the terms "includes", "have", and any variations thereof in the embodiments of the present disclosure are intended to cover non-exclusive inclusion. For example, a process, a method, a system, a product or an apparatus including a series of steps or units need not be limited to the steps or units that are clearly listed, but may include other steps or units that are not clearly listed or inherently included in the process, the method, the system, the product or the apparatus. It is understood that the terms "first", "second", "third", and "fourth" in the present disclosure are used to distinguish objects from each other, and are not used to describe a particular order.

The present disclosure provides an operating system switching method and apparatus, an electronic device, and a storage medium. When a display apparatus is in an off-screen state, operating systems are automatically switched, improving intelligence of the electronic device.

The disclosure will be described in detail by referring to specific embodiments.

In order to more clearly illustrate the operating system switching method and the operating system switching apparatus, the electronic device, and the storage medium in the embodiments of the present disclosure, an application scenario in which the operating system switching method is applicable will be firstly introduced. In a case, the method may be applied to any electronic device that is installed with a plurality of operating systems. The electronic device includes, but not limited to, a portable device, such as a mobile phone and a tablet computer; wearable devices, such as a smart watch and a smart bracelet; and desktop devices, such as a television and a desktop computer, which will not be limited herein.

Figure 1:
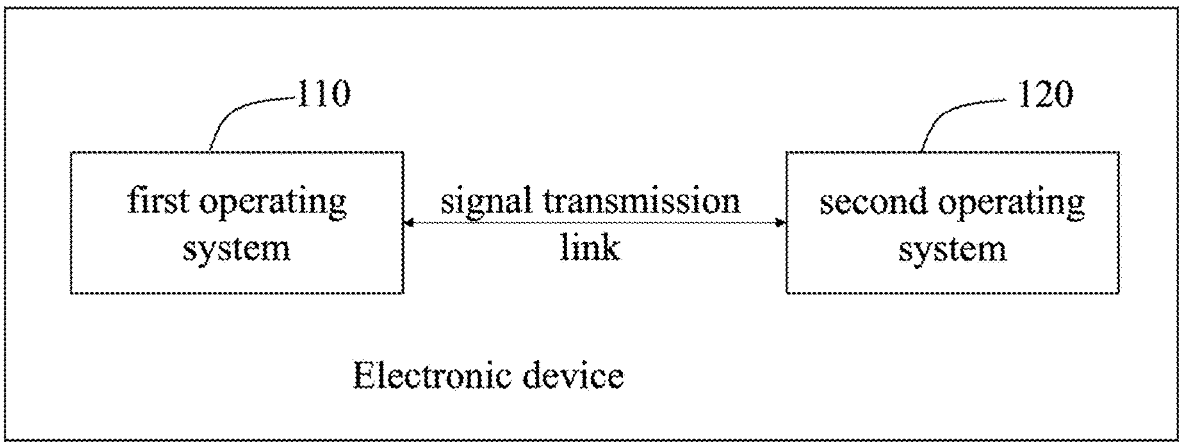
FIG. 1 is a structural schematic view of an electronic device according to an embodiment of the present disclosure.

As shown in FIG. 1, FIG. 1 is a structural schematic view of the electronic device according to an embodiment of the present disclosure. In some embodiments, the electronic device may include a plurality of operating systems. FIG. 1 shows only two operating systems (i.e., a first operating system 110 and a second operating system 120) for exemplary illustration only. The shown operating systems shall not limit the present disclosure. The first operating system 110 and the second operating system 120 may have different computing and processing capabilities and have different operating power consumption. In some embodiments, the first operating system 110 may include, but is not limited to, the Android operating system and the Linux operating system. The second operating system 120 may include, but is not limited to, the Real Time Operating System (RTOS) and the Windows operating system.

In some embodiments, the electronic device may include a first processor and a second processor. Each of the first processor and the second processor may be a central processing unit (CPU) for performing various logic computations and controls. The first operating system 110 may be installed in the first processor included in the electronic device, and the second operating system 120 may be installed in the second processor included in the electronic device. A signal transmission link may be established between the first processor and the second processor, enabling communication interaction between the first processor and the second processor. Further, in a case that the signal transmission link is established between the first processor and the second processor, in response to a displaying apparatus of the electronic device being in an off-screen state for a first time length (such as 0 seconds, 5 seconds, 10 seconds, which is not limited herein), the electronic device may be directly switched from the first operating system to the second operating system. During the switching process, it is not required to deactivate the first operating system before activating the second operating system. In this way, a speed of the electronic device switching from the first operating system to the second operating system is improved. Compared to the method in the art, for the method in the present disclosure, the user does not need to manually switch the operating system, improving the intelligence of the electronic device. In addition, it is avoided to switch the operating system when the displaying apparatus is in a screen-on state, such that the displaying apparatus may not have mosaic.

Further, when the displaying apparatus of the electronic device is switched from the off-screen state to the screen-on state, the electronic device may remain using the second operating system, preventing the operating systems from being switched frequently, and normal operation of the electronic device may not be affected.

Accordingly, the operating system switching method in the embodiments of the present disclosure will be described in detail below.

Figure 2:
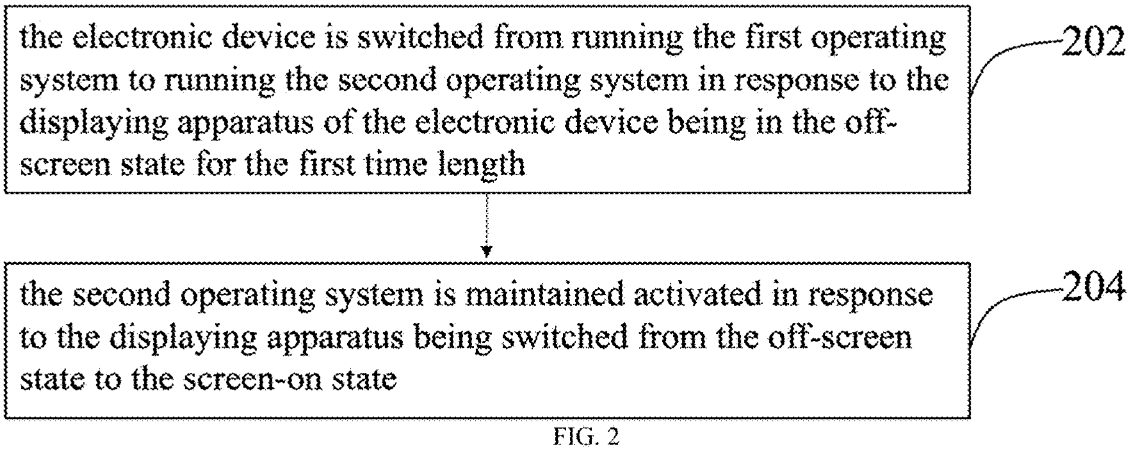
FIG. 2 is a flow chart of an operating system switching method according to an embodiment of the present disclosure.

As shown in FIG. 2, FIG. 2 is a flow chart of an operating system switching method according to an embodiment of the present disclosure. The method may be applied to the electronic device described above. The electronic device can run the first operating system and the second operating system. The method may include the following blocks.

In a block 202, the electronic device is switched from the first operating system to the second operating system in response to the displaying apparatus of the electronic device being in the off-screen state for the first time length.

In the present disclosure, the electronic device may be installed with a plurality of operating systems, such as three, four, and so on, which will not be limited herein.

It is understood that the operating system switching method of the present application may be performed to achieve switching between any two operating systems of the plurality of operating systems.

The first operating system may be an operating system that is being used by the electronic device, i.e., a majority of logical operations that need to be performed by the electronic device are being performed by the first operating system. The first operating system may control external devices (including, but not limited to, a displaying apparatus, a button, a speaker, and so on) included in the electronic device. It is understood that the displaying apparatus (especially the displaying apparatus including a touch screen) is a window for the user to interact with the electronic device. When the displaying apparatus is in the off-screen state, it is indicated that the user is not using the electronic device. At this moment, switching the first operating system to the second operating system may not interrupt operations performed by the user on the first operating system. In some embodiments, the electronic device may be switched from the first operating system to the second operating system in response to determining that the displaying apparatus of the electronic device being in the off-screen state for the first time length.

In some embodiments, the first time length may be 0 seconds, i.e., the electronic device may be switched from the first operating system to the second operating system instantly when determining that the displaying apparatus is in the off-screen state, such that the speed of switching is improved.

In another embodiment, the electronic device needs to use the first operating system within a short period of time after the displaying apparatus enters the off-screen state. In this case, if the electronic device is switched to the second operating system instantly when the displaying apparatus enters the off-screen state, the electronic device needs to be switched from the second operating system to the first operating system again. Therefore, the electronic device may switch operating systems frequently within a short period of time, such that the normal operation of the electronic device may be affected. Therefore, the first time length may be greater than 0 seconds, such as 10 seconds, 20 seconds, and so on, which will not be limited herein. In this way, a certain buffer time length is given to the electronic device after the displaying apparatus is in the off-screen state, preventing the operating systems from being frequently switched within a short period of time.

In a block 204, the second operating system is maintained in response to the displaying apparatus being switched from the off-screen state to the screen-on state.

It is understood that after the electronic device switching from the first operating system to the second operating system, the second operating system will be used as an operating system that is primarily used by the electronic device for performing the majority of the logic computations of the electronic device and can control the external devices included in the electronic device. That is, the switching from the first operating system to the second operating system includes the control of the external devices (such as the displaying apparatus) being switched from the first operating system to the second operating system. Therefore, if the display device switches from the second operating system to the first operating system instantly when the displaying apparatus is switched from the off-screen state to the screen-on state, a task that is executed by the second operating system may be interrupted, such that the normal operation of the electronic device may be affected. Therefore, in some embodiments, in response to the displaying apparatus being switched from the off-screen state to the screen-on state, the second operating system is maintained, i.e., the operating system switching operation is not performed.

In some embodiments, the electronic device may maintain the second operating system after determining that the displaying apparatus switches from the off-screen state to the screen-on state.

In another embodiment, after determining that the displaying apparatus is switched from the off-screen state to the screen-on state, the electronic device may switch from the second operating system to the first operating system only when it is determined that the electronic device satisfies a first switching condition for switching to the first operating system. Conversely, when the electronic device does not satisfy the first switching condition, the electronic device may maintain the second operating system, preventing the task that is being performed by the second operating system from being interrupted, and preventing the electronic device from switching the operating system excessively frequently.

The first switching condition may include: the first operating system being in an idle state in which no task is being performed; and/or a to-be-performed task needing to be performed by the first operating system. The present disclosure does not limit the first switching condition.

To perform the method disclosed in the above embodiments, in response to determining that the displaying apparatus of the electronic device being in the off-screen state for the first time length, the electronic device may automatically switch from the first operating system to the second operating system without requiring the user to manually perform the switching, such that the intelligence of the electronic device is improved. In addition, a situation in which the displaying apparatus shows mosaic due to switching the operating system when the displaying apparatus is in the screen-on state, may be prevented. Further, after the electronic device switches from the first operating system to the second operating system, in response to detecting that the displaying apparatus is switched from the off-screen state to the screen-on state, the electronic device may maintain the second operating system. In this way, the operating system is prevented from being frequently switched, and normal operation of the electronic device may not be affected.

Figure 3:
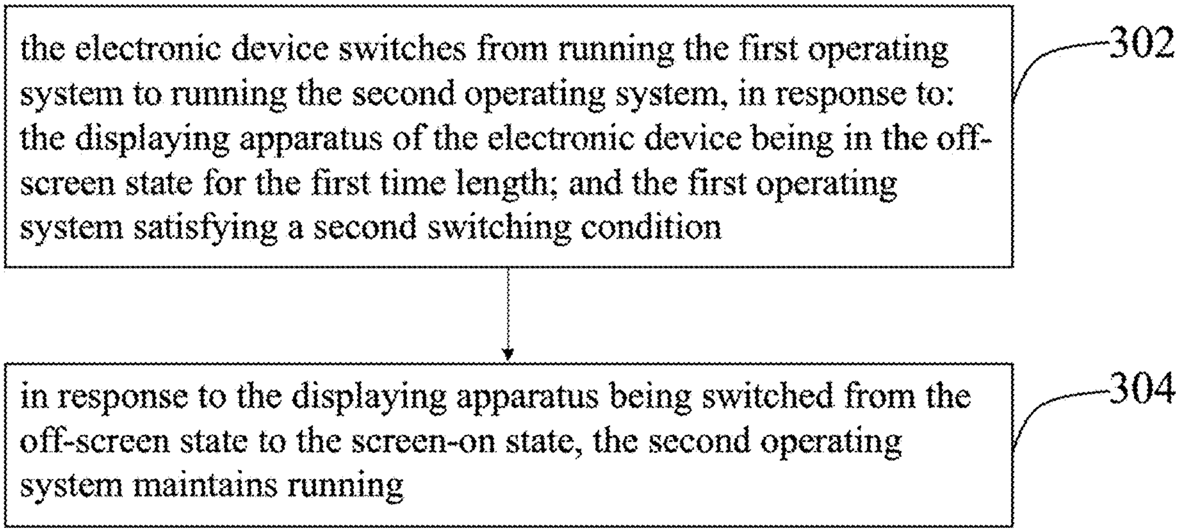
FIG. 3 is a flow chart of another operating system switching method according to an embodiment of the present disclosure.

As shown in FIG. 3, FIG. 3 is a flow chart of another operating system switching method according to an embodiment of the present disclosure. The method may be applied to the electronic device described above. The electronic device may run the first operating system and the second operating system, and the method may include the following blocks.

In a block 302, the electronic device switches from the first operating system to the second operating system, in response to: the displaying apparatus of the electronic device being in the off-screen state for the first time length; and the first operating system satisfying a second switching condition.

In some embodiments, when the electronic device is running the first operating system, the task being executed by the first operating system may be interrupted if the electronic device switches from the first operating system to the second operating system.

Therefore, in some embodiments, after it is determined that the displaying apparatus of the electronic device is being in the off-screen state for the first time length, the electronic device may switch from the first operating system to the second operating system only when it is determined that the first operating system satisfies the second switching condition.

The second switching condition may include: the first operating system being in the idle state. The idle state refers to a state in which no target task is being executed. The target task may include, not limited to, music playing, video playing, performing localization, performing a running function, and displaying a certain interface.

When the above method is performed, a situation in which the task currently being executed by the first operating system is interrupted due to the electronic device switches from the first operating system to the second operating system, may be avoided, such that the normal operation of the electronic device may not be affected.

In another embodiment, the electronic device switches from the first operating system to the second operating system without deactivating the first operating system, in response to determining that the displaying apparatus is in the off-screen state for the first time length and the first operating system satisfies the second switching condition.

When the above method is performed, the speed of switching from the first operating system to the second operating system can be improved, in addition, a shutdown animation may not be played, such that the displaying apparatus does not need to operate, and a senseless switching may be achieved.

In another embodiment, in a case that the displaying apparatus of the electronic device is in the off-screen state for the first time length, an operation of determining whether the first operating system satisfies the second switching condition may be performed at an interval of a second time length. Furthermore, in response to determining that the first operating system satisfies the second switching condition, the electronic device switches from the first operating system to the second operating system.

In another embodiment, in response to: the displaying apparatus of the electronic device being in the off-screen state for the first time length, and the first operating system not satisfying the second switching condition, it is indicated that, at this time, the electronic device cannot switch from the first operating system to the second operating system. In this case, the electronic device may trigger a cyclic detection mechanism. For the cyclic detection mechanism, the electronic device performs, at the interval of the second time length, the operation of determining whether the first operating system satisfies the second switching condition. Further, in response to determining, during the cyclic detection mechanism, that the first operating system satisfies the second switching condition, the electronic device switches from the first operating system to the second operating system.

The second time length may be determined by a developer based on a large amount of development experiments, and a typical value of the second time length may be 1 second, 2 seconds, and so on, which will not be limited herein.

When performing the above method, in a case that the first operating system does not satisfy the second switching condition, the electronic device may continuously determine, based on the cyclic detection mechanism, whether the first operating system satisfies the second switching condition. In this way, the electronic device switches to the second operating system instantly when the first operating system satisfies the second switching condition, such that the intelligence of the electronic device is improved.

In another embodiment, in a process of triggering the cyclic detection mechanism, in response to the displaying apparatus being detected as being switched from the off-screen state to the screen-on state, the electronic device may exit the cyclic detection mechanism. In this way, in a subsequent process of running the first operating system, a situation in which the task being executed by the first operating system is interrupted due to the cyclic detection mechanism detecting that the first operating system satisfies the second switching condition and switching from the first operating system to the second operating system, may be prevented.

In another embodiment, in a case that the displaying apparatus of the electronic device is in the off-screen state for the first time length and the first operating system is executing the target task, the electronic device obtains the target task that is being executed by the first operating system.

Further, the electronic device predicts a predicted time length that the first operating system spends on executing the target task. In response to the predicted time length being less than a time length threshold (a specific value may be determined by the developer based on a large amount of development experiences, and a typical value may be 20 minutes, 30 minutes, and so on, which will not be limited herein), the cyclic detection mechanism is triggered. In response to the predicted time length being equal to the time length threshold, the cyclic detection mechanism is allowed to be activated, until the displaying apparatus switches to the screen-on state.

When performing the above method, in response to predicting that the time length consumed by the first operating system to perform the target task is excessively long, it is indicated that the electronic device cannot switch to the second operating system in a short period of time. In this case, the cyclic detection mechanism may not be triggered, the power consumption for executing the cyclic detection mechanism may be saved.

In some embodiments, when the displaying apparatus of the electronic device is in the off-screen state, a trigger event that causes the displaying apparatus to enter the off-screen state may be obtained. The trigger event may include a manual trigger event and a timed off-screen trigger event. The manual trigger event refers to an event that is manually performed by the user to turn off the screen of the electronic device. The timed off-screen trigger event refers to an event in which the displaying apparatus is automatically turned off when the electronic device does not detect any operation performed on the displaying apparatus within a certain period of time. Further, the electronic device may adjust the first time length according to the trigger event that causes the displaying apparatus to enter the off-screen state, and obtain the adjusted first tine length.

Further, in a case that the displaying apparatus of the electronic device is in the off-screen state for the adjusted first time length, the electronic device switches from the first operating system to the second operating system In some embodiments, in response to the trigger event that causes the displaying apparatus to enter the off-screen state is the manual trigger event, the first time length may be adjusted to be 0 seconds. That is, the electronic device may switch from the first operating system to the second operating system instantly when determining that the displaying apparatus is in the off-screen state. It is understood that the user manually turning off the displaying apparatus indicates that the user does not need to use the displaying apparatus temporarily, and therefore, the electronic device may immediately switch from the first operating system to the second operating system.

In another embodiment, in response to the trigger event that causes the displaying apparatus to enter the off-screen state being the timed off-screen trigger event, the first time length may be adjusted to be greater than 0 seconds, such as 10 seconds, 20 seconds, and the like, which will not be limited herein. It is understood that after the electronic device enters the off-screen state due to the timed off-screen function, the user may use the displaying apparatus and the first operating system again at any time. Therefore, after the displaying apparatus is turned off, a certain time length is given to the electronic device, preventing the operating system from being frequently switched within a short period of time.

In some embodiments, in response to the trigger event that causes the displaying apparatus to enter the off-screen state being the timed off-screen trigger event, the electronic device may obtain a current system time of the electronic device and the physiological data of the user. In response to the current system time being within a rest time period and the physiological data of the user matching target data, the first time length is adjusted to be 0 seconds. The target data is physiological data that the user is sleeping state.

When performing the above method, even when the displaying apparatus enters the off-screen state due to the timed off-screen function, the user is sleeping and may not use the displaying apparatus and the first operating system in a short period of time. Therefore, the first time length can be adjusted to 0 seconds to enable the electronic device to immediately switch from the first operating system to the second operating system.

In a block 304, in response to the displaying apparatus being switched from the off-screen state to the screen-on state, the second operating system is maintained.

In some embodiments, an operation power consumption of the second operating system may be less than that of the first operating system. The first switching condition may include: a current power level of the electronic device being greater than a first power level (a specific value of the power level may be determined by the developer based on a large amount of development experience, such as a typical value of 20%, 25%, and so on, of the full battery power level of the electronic device, which will not be limited herein). It is understood that, in response to the electronic device not satisfying the first switching condition of switching to the first operating system, it is indicated that the current power level of the electronic device is less than or equal to a first power level threshold, and the electronic device is at a low-power state. In this case, in order to extend endurance of the electronic device, the electronic device may continue running the second operating system having the lower power consumption.

According to the method disclosed in each of the above embodiments, the electronic device automatically switches from the first operating system to the second operating system without requiring any operation manually performed by the user, such that the intelligence of the electronic device is improved. Furthermore, a situation that the operating system is switched when the displaying apparatus is in the screen-on state, is avoided, such that the displaying apparatus is prevented from showing mosaic. In addition, the operating system is prevented from being frequently switched, such that the normal operation of the electronic device is not affected. A situation in which the task that is currently being executed by the first operating system is interrupted due to the electronic device switching from the first operating system to the second operating system, may be avoided, such that the normal operation of the electronic device is not affected. In response to the first operating system not satisfying the second switching condition, the cyclic detecting mechanism is running to continuously detect whether or not the first operating system satisfies the second switching condition. In this way, the electronic device switches to the second operating system immediately when the first operating system satisfies the second switching condition, such that intelligence of the electronic device is improved. In the subsequent process of running the first operating system, a situation that the task being executed by the first operating system is interrupted due to the electronic device switching from the first operating system to the second operating system in response to the cyclic detection mechanism detecting that the first operating system satisfies the second switching condition, may be avoided.

Figure 4:
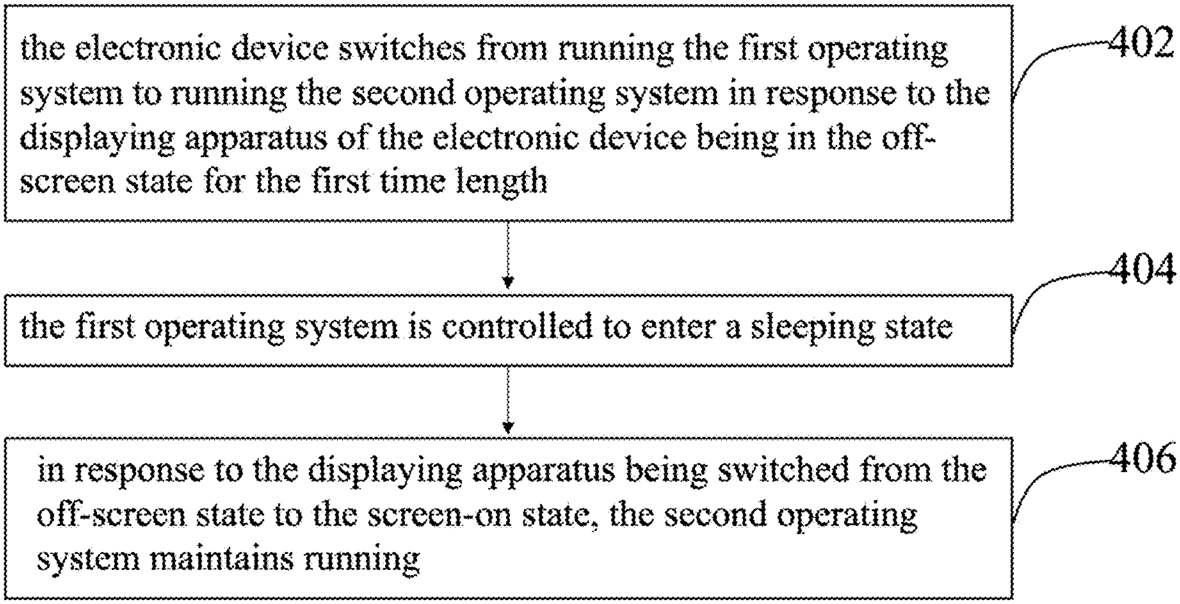
FIG. 4 is a flow chart of still another operating system switching method according to an embodiment of the present disclosure.

As shown in FIG. 4, FIG. 4 is a flow chart of still another operating system switching method according to an embodiment of the present disclosure. The method may be applied to the electronic device described above, the electronic device can run the first operating system and the second operating system, and the method may include the following blocks.

In a block 402, the electronic device switches from the first operating system to the second operating system in response to the displaying apparatus of the electronic device being in the off-screen state for the first time length.

In some embodiments, the electronic device may include a first processor and a second processor. Each of the first processor and the second processor may be a central processing unit (CPU) for performing various logical computations and controls. In some embodiments, the first operating system may be installed in the first processor, and the second operating system may be installed in the second processor.

In some embodiments, a computing and processing capacity of the first processor may be greater than that of the second processor. Therefore, when the electronic device runs the first operating system, the computing and processing capacity of the electronic device may be improved, such that performance of the electronic device is improved, including improvement in a running speed of an application, improvement in picture quality.

In another embodiment, an operation power consumption of the second processor may be less than that of the first processor. Therefore, after the electronic device switches from the first operating system to the second operating system, the power consumption of the electronic device may be reduced.

In an embodiment, in the process of the electronic device switching from the first operating system to the second operating system, in order to avoid a sensation of the switching, which is caused by a power-on animation of the first operating system and a power-off animation of the second operating system being displayed on the displaying apparatus, is prevented from being provided to the user, the power-off animation of the first operating system and the power-on animation of the second operating system are prohibited from being triggered.

According to the above method, the power-off animation and the power-on animation are prohibited from being played during the process of switching the operating system. In this way, a sensation of systems being switched, which is caused by the power-on animation of the first operating system and the power-off animation of the second operating system being displayed on the displaying apparatus, is prevented from being provided to the user, such that senseless switching is achieved.

In an embodiment, the electronic device can run more than two operating systems. Different operating systems correspond to different operation power consumptions. In some embodiments, in a case that the displaying apparatus of the electronic device is in the off-screen state for the first time length and the current power level of the electronic device is lower than a second power level threshold (a specific value may be determined by the developer based on a large amount of development experience, and a typical value may be 18%, 20%, and so on, of the full battery power level of the electronic device, which is not limited herein), the electronic device may determine, from the operating systems that can be run on the electronic device, an operating system having a lowest operation power consumption as the second operating system. In this way, the electronic device switches from the first operating system to the second operating system.

According to the above method, when the electronic device is currently at the low power level, the electronic device switches to run the operating system having the lowest operation power consumption, in order to extend the endurance of the electronic device.

In an embodiment, after the electronic device switches from the first operating system to the second operating system, control of the displaying apparatus may be switched from the first operating system to the second operating system.

It is understood that, after the electronic device switches to the second operating system, the second operating system may perform the majority of the computational control logic of the electronic device. In this case, in order to facilitate the second operating system to control the displaying apparatus, the control of the displaying apparatus may be switched from the first operating system to the second operating system.

In a block 404, the first operating system is controlled to enter a sleeping state.

In an embodiment, after the electronic device switches from the first operating system to the second operating system, in order to further reduce the power consumption of the electronic device, the first operating system is controlled to enter the sleeping state. The sleeping state refers to a state in which only a portion of necessary functions are run and the rest functions other than the necessary functions are turned off. The necessary functions may include functions of sensors, a wake-up function of the operating system, which will not be limited herein.

According to the above method, after the first operating system is switched to a background, the first operating system is controlled to enter the sleeping state to shut down some unnecessary functions, such that the power consumption of the electronic device is reduced.

In a block 406, in response to the displaying apparatus being switched from the off-screen state to the screen-on state, the second operating system is maintained.

According to the above method, the electronic device automatically switches from the first operating system to the second operating system without requiring any operation manually performed by the user, such that intelligence of the electronic device is improved. Furthermore, a situation that the operating system is switched when the displaying apparatus is in the screen-on state, is avoided, such that the displaying apparatus is prevented from showing mosaic. In addition, the operating system is prevented from being frequently switched, such that the normal operation of the electronic device is not affected. After switching the first operating system to the background, the first operating system can be controlled to enter the sleeping state to shut down part of unnecessary functions, such that the power consumption of the electronic device is reduced. In the process of system switching, the power-on animation and the power-off animation are prohibited from being played, in this way, the sensation of the system switching, which is caused by the power-on animation of the first operating system and the power-off animation of the second operating system being displayed on the displaying apparatus, is prevented from being provided to the user, such that senseless switching is achieved. When switching into the first operating system, the computing and processing capability of the electronic device may be improved, such that performance of the electronic device is improved, including improvement in the running speed of the application and improvement in the image quality. When switching into the second operating system, the power consumption of the electronic device is reduced. In this way, flexibility of the electronic device for performing tasks is improved.

Figure 5:
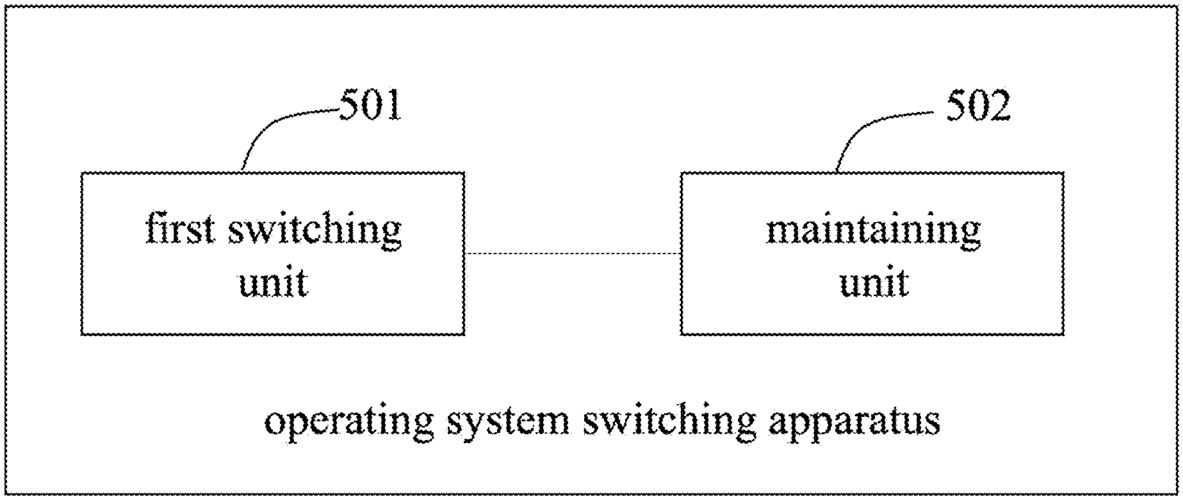
FIG. 5 is a structural schematic diagram of an operating system switching apparatus according to an embodiment of the present disclosure.

As shown in FIG. 5, FIG. 5 is a structural schematic diagram of an operating system switching apparatus according to an embodiment of the present disclosure. The apparatus may be applied to the electronic device described above, the electronic device can run the first operating system and the second operating system. The apparatus may include a first switching unit 501 and a maintaining unit 502.

The first switching unit 501 is configured to switch the electronic device from the first operating system to the second operating system in response to the displaying apparatus of the electronic device being in the off-screen state for the first time length.

The maintaining unit 502 is configured to maintain the second operating system in response to the displaying apparatus being switched from the off-screen state to the screen-on state.

According to the apparatus disclosed in the above embodiments, in response to determining that the displaying apparatus of the electronic device being in the off-screen state for the first time length, the electronic device may automatically switch from the first operating system to the second operating system without requiring the user to manually perform the switching, such that the intelligence of the electronic device is improved. In addition, a situation in which the displaying apparatus shows mosaic due to switching the operating system when the displaying apparatus is in the screen-on state, may be prevented. Further, after the electronic device switches from the first operating system to the second operating system, in response to detecting that the displaying apparatus is switched from the off-screen state to the screen-on state and in response to the electronic device not satisfying the first switching condition for switching into the first operating system, the electronic device may maintain the second operating system. In this way, the operating system is prevented from being frequently switched, and normal operation of the electronic device may not be affected.

In an embodiment, the apparatus shown in FIG. 5 further includes a second switching unit that is not shown in the drawings.

The second switching unit is configured to enable the electronic device to switch from the second operating system to the first operating system, after the electronic device is switched from the first operating system to the second operating system, in response to determining that the displaying apparatus is switched from the off-screen state to the screen-on state, and in response to the electronic device satisfying the first switching condition for switching to the first operating system.

In an embodiment, the first switching unit 501 is configured to enable the electronic device to switch from the first operating system to the second operating system, in response to: the displaying apparatus of the electronic device being in the off-screen state for the first time length; and the first operating system satisfying a second switching condition.

According to the above apparatus, the situation in which the task currently being executed by the first operating system is interrupted due to the electronic device switches from the first operating system to the second operating system, may be avoided, such that the normal operation of the electronic device may not be affected.

In an embodiment, the first switching unit 501 is configured to perform, at an interval of a second time length, the operation of determining whether the first operating system satisfies the second switching condition, in response to the displaying apparatus of the electronic device being in the off-screen state for the first time length. The first switching unit 501 is configured to enable the electronic device to switch from the first operating system to the second operating system when it is determined that the first operating system satisfies the second switching condition.

In an embodiment, the first switching unit 501 is configured to trigger the cyclic detection mechanism in response to: the displaying apparatus of the electronic device being in the off-screen state for the first time length, and the first operating system not satisfying the second switching condition. For the cyclic detection mechanism, the operation of determining whether the first operating system satisfies the second switching condition is performed at the interval of the second time length. In response to determining, during the cyclic detection mechanism, that the first operating system satisfies the second switching condition, the first switching unit 501 is configured to enable the electronic device to switch from the first operating system to the second operating system.

According to the above apparatus, in the case that the first operating system does not satisfy the second switching condition, the cyclic detection mechanism is continuously running to detect whether the first operating system satisfies the second switching condition. In this way, the electronic device is enabled to switch to the second operating system immediately when the first operating system satisfies the second switching condition, such that the intelligence of the electronic device is improved.

In an embodiment, the apparatus shown in FIG. 5 further includes an exit unit that is not shown in the drawings.

The exit unit is configured to enable the electronic device to exit the cyclic detection mechanism, in response to the displaying apparatus being detected, after triggering the cyclic detection mechanism, as being switched from the off-screen state to the screen-on state.

According to the above apparatus, in a subsequent process of running the first operating system, the situation in which the task being executed by the first operating system is interrupted due to the cyclic detection mechanism detecting that the first operating system satisfies the second switching condition and the electronic device switching from the first operating system to the second operating system, may be prevented.

The second switching condition may include: the first operating system being in the idle state. The idle state refers to the state in which no target task is being executed.

According to the above apparatus, the situation in which the task being executed by the first operating system is interrupted due to the electronic device switching from the first operating system to the second operating system, may be prevented, such that the normal operation of the electronic device may not be affected.

In an embodiment, the apparatus shown in FIG. 5 further includes a control unit that is not shown in the drawings.

The control unit is configured to control the first operating system to enter the sleeping state after enabling the electronic device to switch from the first operating system to the second operating system.

According to the above apparatus, after the first operating system is switched to the background, the first operating system is controlled to enter the sleeping state to shut down some unnecessary functions, such that the power consumption of the electronic device is reduced.

In an embodiment, the apparatus shown in FIG. 5 further includes a prohibition unit that is not shown in the drawings.

The prohibition unit is configured to prohibit the power-on animation of the first operating system and the power-off animation of the second operating system from being displayed in the process of the electronic device switching from the first operating system to the second operating system.

According to the above apparatus, in the process of the system switching, the power-on animation and the power-off animation are prohibited from being played. In this way, the sensation of the switching, which is caused by the power-on animation of the first operating system and the power-off animation of the second operating system being played on the displaying apparatus, is prevented from being provided to the user, and a senseless switching may be achieved.

In an embodiment, the electronic device may include the first processor and the second processor. The first processor runs the first operating system, and the second processor runs the second operating system. The operation power consumption of the second processor may be less than that of the first processor.

According to the above apparatus, when switching into the first operating system, the computing and processing capability of the electronic device may be improved, such that performance of the electronic device is improved, including improvement in the running speed of the application and improvement in the image quality. When switching into the second operating system, the power consumption of the electronic device is reduced. In this way, flexibility of the electronic device for performing tasks is improved.

In an embodiment, the apparatus shown in FIG. 5 further includes a third switching unit.

The third switching unit is configured to switch control of the displaying apparatus from the first operating system to the second operating system after the electronic device is switched from the first operating system to the second operating system.

Figure 6:
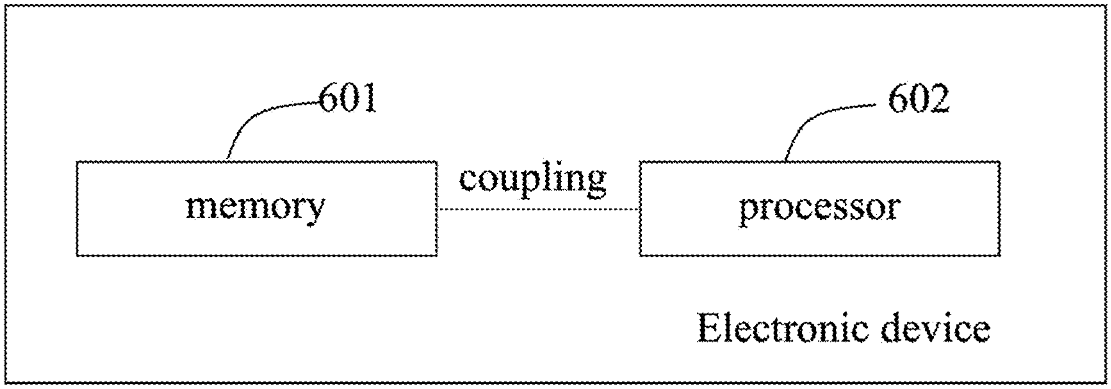
FIG. 6 is a structural schematic view of another electronic device according to an embodiment of the present disclosure.

As shown in FIG. 6, FIG. 6 is a structural schematic view of another electronic device according to an embodiment of the present disclosure. As shown in FIG. 6, the electronic device may include the following.

A memory 601 stores executable program codes.

A processor 602 is coupled to the memory 601.

The processor 602 invokes the executable program codes stored in the memory 601 to perform the operating system switching method disclosed in the above embodiments The present disclosure provides a computer-readable storage medium storing a computer program. The computer program causes the computer to perform the operating system switching method described in the above embodiments.

The present disclosure further provides an application releasing platform. The application releasing platform is configured to release a computer program product. When the computer program product is run on a computer, the computer is enabled to perform some or all of the operations of the method in the above embodiments.

It is to be understood that references to "an embodiment" or "one embodiment" mean that a particular feature, structure, or property associated with an embodiment is included in at least one embodiment of the present disclosure. Therefore, "in an embodiment" or "in one embodiment" at various sections of the specification may not necessarily refer to a same embodiment. Furthermore, these particular features, structures or properties may be combined in one or more embodiments in any suitable manner. Any ordinary skilled person in the art shall understand that the embodiments described in the specification are optional embodiments, and actions and modules involved herein may not be necessary for the present disclosure.

In various embodiments of the present disclosure, it is understood that the number magnitude of each operation does not imply a necessary execution sequence. The order of executing the operations should be determined by their functions and inherent logic. The numbers herein do not limit implementation of the embodiments of the present disclosure.

Units illustrated above as separated components may or may not be physically separated. Components shown as units may or may not be object units, i.e., each component may be located at one place, or may be distributed to a plurality of network units. Some or all of the units may be selected to fulfill the purpose of the embodiments according to actual demands.

In addition, each functional unit in each embodiment of the present disclosure may be integrated in one processing unit, or each unit may physically exist independently, or two or more units may be integrated in one unit. The above integrated units may be achieved either in the form of hardware or in the form of software functional units.

The above integrated units may be stored in a computer-accessible memory when being achieved as software functional units and sold or used as stand-alone products. Accordingly, the technical solution of the present disclosure in essence, or the part that contributes to the art, or all or part of the technical solution, may be embodied in the form of a software product, which is stored in a memory. The software product includes a number of requests to enable a computer device (which may be a personal computer, a server, or a network device, and so on, and in particular may be a processor in the computer device) to perform some or all of the above methods in the various embodiments of the present disclosure.

Any ordinary skilled person in the art may understand that all or some of the operations in the various methods of the above embodiments are accomplishable by a program to instruct an associated hardware. The program may be stored in a computer-readable storage medium. The storage medium includes a read-only memory (ROM), a random access memory (RAM), a programmable read-only memory (PROM), an erasable programmable read-only memory (EPROM), an one-time programmable read-only memory (OTPROM), an electrically-erasable programmable read-only memory (EEPROM), a compact disc read-only memory (CD-ROM) or other optical disk memories, a magnetic disk memory, a magnetic tape memory, or any other computer-readable medium capable of carrying or storing data.

In the above, the operating system switching method and apparatus, the electronic device, and the storage medium are described in detail in the embodiments of the present disclosure. Specific examples are applied herein to elaborate the principles and implementation of the present disclosure. The above description of the embodiments is only used to assist in understanding the method of the present disclosure and the essential concept idea thereof. In addition, any ordinary skilled person in the art may make changes in the specific implementation and the scope of the disclosure based on the concept of the present disclosure. In summary, the contents of the specification of the present disclosure shall not be interpreted as a limitation of the present disclosure.

What is claimed is:

1. An operating system switching method, performed by an electronic device, the electronic device being capable of running a first operating system and a second operating system, wherein the method comprises:

switching, by the electronic device, from the first operating system to the second operating system in response to a displaying apparatus of the electronic device being in an off-screen state for a first time length; and maintaining the second operating system in response to the displaying apparatus being switched from the off-screen state to the screen-on state;

wherein, after the electronic device switching from running the first operating system to running the second operating system, the second operating system has authority for controlling external devices of the electronic device, the external devices comprise the displaying apparatus.

2. The method according to claim 1, wherein, after the switching from the first operating system to the second operating system, the method further comprises:

switching, by the electronic device, from the second operating system to the first operating system, in response to: the displaying apparatus being switched from the off-screen state to the screen-on state; and the electronic device satisfying a first switching condition for switching to the first operating system.

3. The method according to claim 1, wherein, the switching from the first operating system to the second operating system in response to the displaying apparatus of the electronic device being in the off-screen state for the first time length, comprises:

the electronic device switching from the first operating system to the second operating system, in response to: the displaying apparatus of the electronic device being in the off-screen state for the first time length; and the first operating system satisfying a second switching condition.

4. The method according to claim 1, wherein, the switching from the first operating system to the second operating system in response to the displaying apparatus of the electronic device being in the off-screen state for the first time length, comprises:

performing, at an interval of a second time length, an operation of determining whether the first operating system satisfies the second switching condition, in response to the displaying apparatus of the electronic device being in the off-screen state for the first time length; and the electronic device switching from the first operating system to the second operating system in response to determining that the first operating system satisfies the second switching condition.

5. The method according to claim 1, wherein, the switching from the first operating system to the second operating system in response to the displaying apparatus of the electronic device being in the off-screen state for the first time length, comprises:

triggering a cyclic detection mechanism in response to: the displaying apparatus of the electronic device being in the off-screen state for the first time length; and the first operating system not satisfying the second switching condition; wherein, in the cyclic detection mechanism, an operation of determining whether the first operating system satisfies the second switching condition is performed at an interval of a second time length; and the electronic device switching from the first operating system to the second operating system, in response to determining, during the cyclic detection mechanism, that the first operating system satisfies the second switching condition.

6. The method according to claim 1, wherein, after the switching from the first operating system to the second operating system, the method further comprises:

controlling the first operating system to enter a sleeping state.

7. The method according to claim 1, wherein, the switching from the first operating system to the second operating system, comprises:

switching a control of the displaying apparatus from the first operating system to the second operating system.

8. The method according to claim 1, wherein, the switching from the first operating system to the second operating system in response to the displaying apparatus of the electronic device being in the off-screen state for the first time length, comprises:

switching a control of external devices from the first operating system to the second operating system.

9. The method according to claim 1, wherein, the switching from the first operating system to the second operating system in response to a displaying apparatus of the electronic device being in an off-screen state for the first time length, comprises:

switching, by the electronic device, from the first operating system to the second operating system when determining that the displaying apparatus is in the off-screen state; or in response to a trigger event that causes the displaying apparatus to enter the off-screen state being a manual trigger event, switching from the first operating system to the second operating system when determining that the displaying apparatus is in the off-screen state.

10. The method according to claim 1, wherein, the electronic device comprises a first processor and a second processor, the first processor is configured to run the first operating system, and the second processor is configured to run the second operating system, an operation power consumption of the second processor is less than that of the first processor.

11. The method according to claim 2, wherein, the first switching condition comprises:

the first operating system being in an idle state, the idle state refers to a state in which the first operating system is not performing any task; and/or a to-be-performed task of the electronic device needing to be performed by the first operating system.

12. The method according to claim 3, wherein, the second switching condition comprises: the first operating system being in an idle state; and the idle state refers to a state in which no target task is being executed.

13. The method according to claim 5, further comprising:

exiting the cyclic detection mechanism, in response to the displaying apparatus being detected, during the cyclic detection mechanism, as being switched from the off-screen state to the screen-on state.

14. The method according to claim 8, wherein, a computing and processing capacity of the first processor is greater than that of the second processor.

15. An electronic device, comprising a memory, storing executable program codes; and a processor coupled to the memory; wherein a first operating system and a second operating system are installed in the electronic device, the processor is configured to invoke the executable program codes stored in the memory to perform operations of:

switching from the first operating system to the second operating system in response to a displaying apparatus of the electronic device being in an off-screen state for a first time length; and maintaining the second operating system in response to the displaying apparatus being switched from the off-screen state to the screen-on state;

wherein, after the electronic device switching from running the first operating system to running the second operating system, the second operating system has authority for controlling external devices of the electronic device, the external devices comprise the displaying apparatus.

16. The electronic device according to claim 15, wherein, after the switching from the first operating system to the second operating system, the processor is configured to invoke the executable program codes stored in the memory to further perform:

switching from the second operating system to the first operating system, in response to: the displaying apparatus being switched from the off-screen state to the screen-on state; and the electronic device satisfying a first switching condition for switching to the first operating system.

17. The electronic device according to claim 15, wherein when switching from the first operating system to the second operating system, the processor is configured to invoke the executable program codes stored in the memory to perform:

switching a control of the displaying apparatus from the first operating system to the second operating system.

18. The electronic device according to claim 15, comprising: a first processor and a second processor, wherein, the first processor is configured to run the first operating system, and the second processor is configured to run the second operating system, an operation power consumption of the second processor is less than that of the first processor; wherein, after switching from the first operating system to the second operating system, the processor is configured to invoke the executable program codes stored in the memory to further perform:

controlling the first operating system to enter a sleeping state.

19. The electronic device according to claim 16, wherein the first switching condition comprises:

the first operating system being in an idle state, the idle state refers to a state in which the first operating system is not performing any task; and/or a to-be-performed task of the electronic device needing to be performed by the first operating system.

20. A computer readable storage medium, storing a computer program, wherein, the computer program is configured to implement, when being executed by a processor, operations of:

enabling an electronic device to switch from a first operating system to a second operating system in response to a displaying apparatus of the electronic device being in an off-screen state for a first time length; and enabling the electronic device to maintain the second operating system in response to the displaying apparatus being switched from the off-screen state to the screen-on state;

wherein, after the electronic device switching from running the first operating system to running the second operating system, the second operating system has authority for controlling external devices of the electronic device, the external devices comprise the displaying apparatus.

* * * * *